C. H. MARSHALL.
CHERRY PITTING MACHINE.
APPLICATION FILED JUNE 18, 1919.

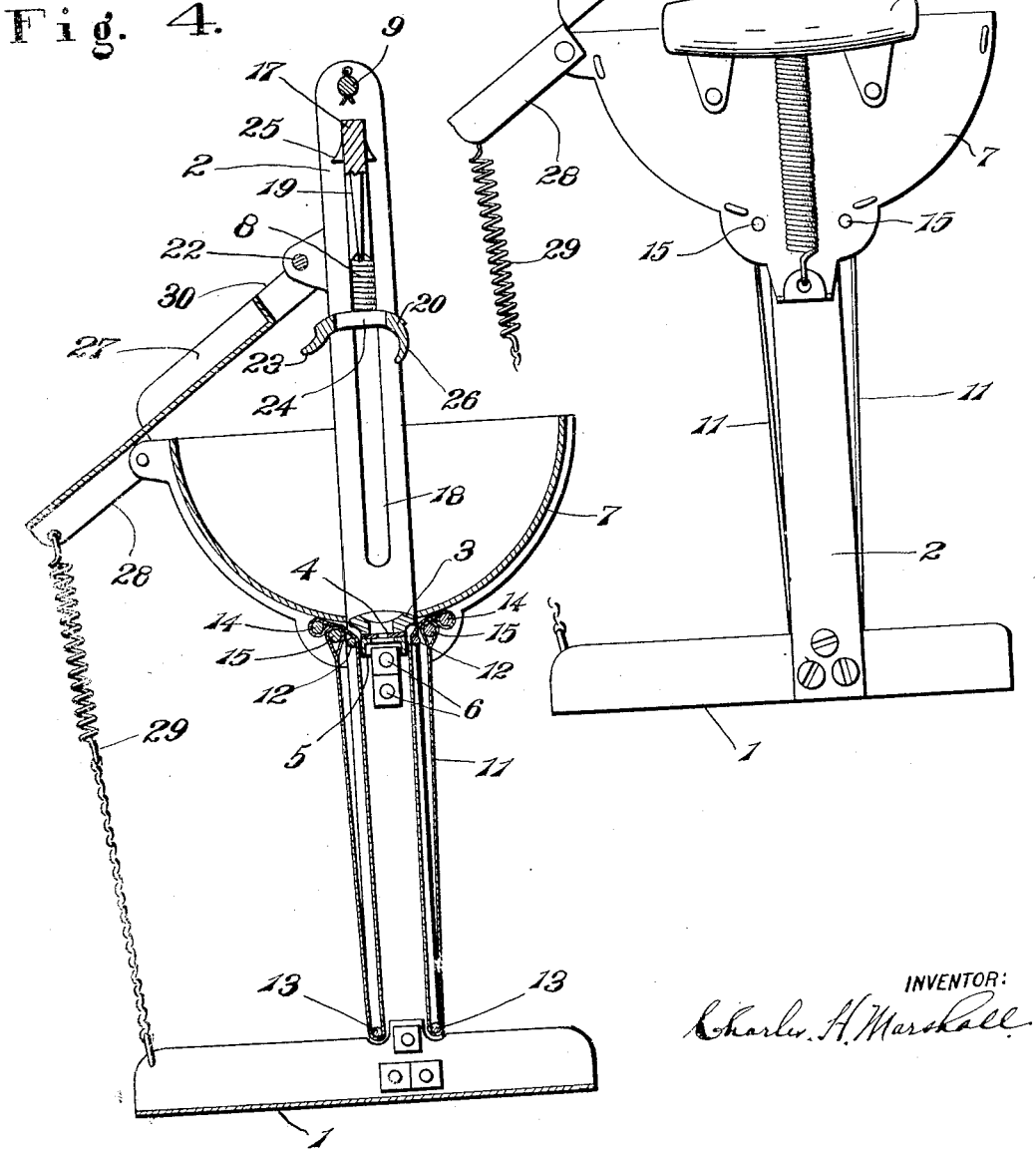

1,331,274.

Patented Feb. 17, 1920.
4 SHEETS—SHEET 4.

INVENTOR:
Charles H. Marshall

UNITED STATES PATENT OFFICE.

CHARLES H. MARSHALL, OF OMAHA, NEBRASKA, ASSIGNOR TO MARSHALL MANUFACTURING COMPANY, OF OMAHA, NEBRASKA, A CORPORATION OF NEBRASKA.

CHERRY-PITTING MACHINE.

1,331,274.

Specification of Letters Patent.   Patented Feb. 17, 1920.

Application filed June 18, 1919. Serial No. 305,100.

*To all whom it may concern:*

Be it known that I, CHARLES H. MARSHALL, a citizen of the United States, residing at Omaha, in the county of Douglas and State of Nebraska, have invented certain new and useful Improvements in Cheery-Pitting Machines; and I do hereby declare the following to be a full, clear, and exact description of the invention, such as will enable others skilled in the art to which it appertains to make and use the same.

My invention, broadly considered, relates to feeding and discharging mechanism, being an improved device for placing articles in position to be operated upon and discharging such articles after the operation has been performed.

In its specific aspect, the invention consists in certain improvements in cherry-pitting machines of the type shown in Patent No. 1,167,005, issued to me Jan. 4, 1916. When the machine shown in the said patent is used to pit overripe cherries, it sometimes happens that the fruit which is rubbed up and down the walls of the pit receiver becomes mutilated and that the soft pulp is not always lifted from the punching block after the pits have been punched out. One of the objects of the present invention is to eliminate the objectionable rubbing of the fruit during relative movement of the hopper and punching block. Another object is to insure removal of the fruit from the punching block after the pits have been punched out.

Other objects and advantages will appear as the description proceeds.

In the accompanying drawings which form part of this application;

Fig. 3 is an elevational view looking from the left side of the machine;

Fig. 4 is a vertical section taken through one of the cherry receiving depressions and showing the positions of the parts when the hopper is elevated;

Figure 1:
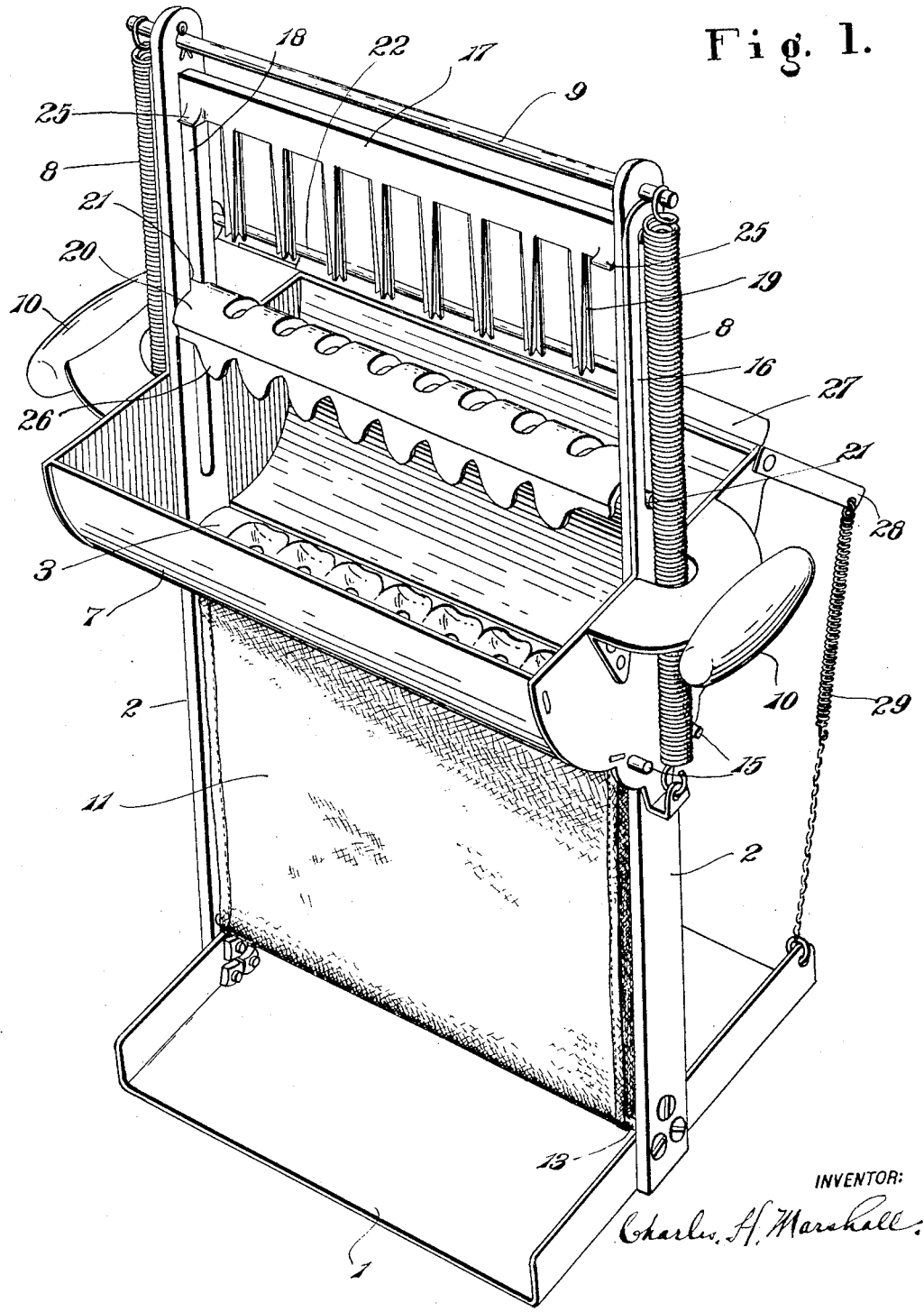
Figure 1 is a perspective view of a cherry-pitting machine embodying the invention.

Referring to the drawings in detail, the frame of the machine comprises a base plate 1 to each end of which is rigidly secured a standard 2.

Figure 2:
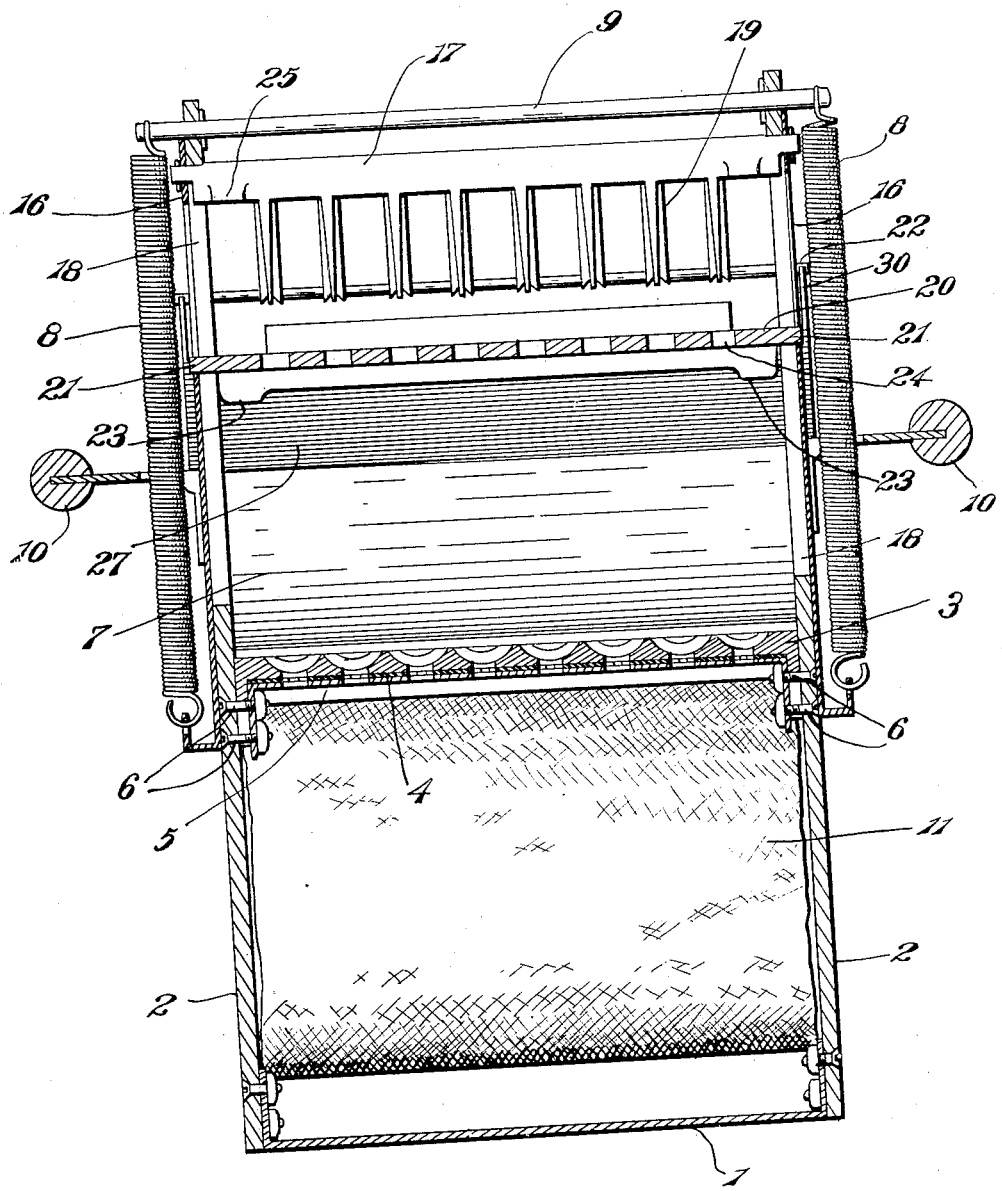
Fig. 2 is a central vertical section looking from the front of the machine, some of the parts being shown in elevation.

An elongated punching block 3 extends between and has its ends rigidly secured to the standards 2. The upper surface of the punching block is crowned and is provided with a series of depressions adapted to receive cherries, while a perforation which is large enough for the passage of a cherry pit extends from the bottom of each depression downwardly through the punching block. A strip 4 of resilient material, such as rubber or leather, is held against the lower side of the punching block by means of a channel bar 5, the resilient strip and the channel bar having perforations which register with the perforations of the punching block. The perforations in the punching block and in the channel bar are round, while those in the resilient strip are cruciform. The punching block and channel bar are held in place by the bolts 6, as clearly shown in Fig. 2.

Mounted for vertical reciprocation upon the standards 2 is a substantially semi-cylindrical hopper 7 having a slot in its bottom which is substantially filled by the punching block when the hopper is in its uppermost position (see Fig. 4) and upwardly through the ends of which slot the standards 2 extend. The hopper is normally held in its uppermost position by springs 8 which are connected at their upper ends to a rod 9 supported by the upper ends of the standards 2, the lower ends of the springs being connected to ears on the ends of the hopper. Handles 10, by means of which the hopper may be moved downwardly against the tension of the springs, are secured to the ends of the hopper.

Since the slot in the bottom of the hopper is filled by the punching block only while the hopper is in elevated position, it is necessary that some means be provided to prevent the contents of the hopper escaping through the slot when the bottom of the hopper is below the block. In the machine shown in my patent, mentioned above, this result was accomplished by immovable walls extending downwardly from the block. In this case I have provided walls which move with the hopper so that the contents of the hopper do not slide or rub along the walls as the hopper is moved.

Figure 5:
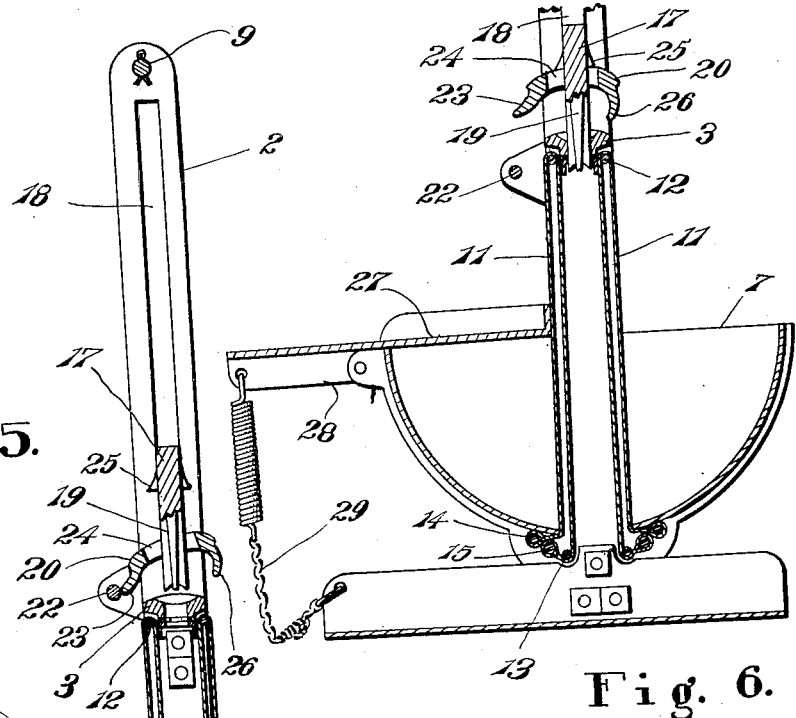
Fig. 5 is a section taken on the same plane as that of Fig. 4, showing the relation of the parts at a time near the end of the downward movement of the hopper.
Figure 6:
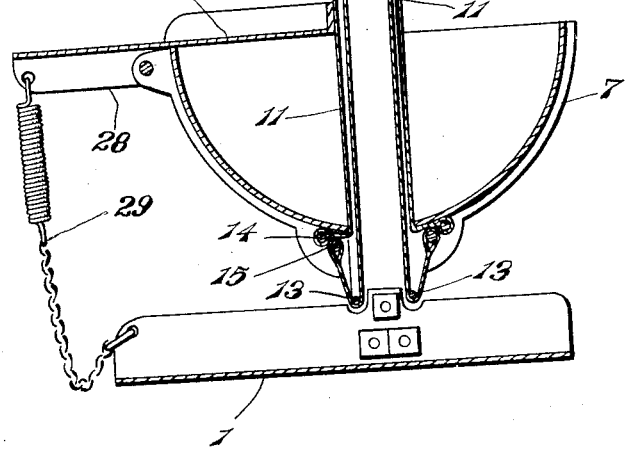
Fig. 6 is a fragmental section taken on the same plane as Fig. 5, showing the hopper in its lowermost position.

The said walls consist of sheets 11, of flexible material which passes over rods 12 and 13, having their ends mounted in the standards 2. I prefer to journal the ends of the rods in the standards so that they will act as pulleys, but they may, if desired, be rigidly mounted, in which case the sheets will slide over them. I have shown the sheets as made of fabric with the edges hemmed. After the sheets have been passed over the rods 12 and 13, a rod 14 which is slightly shorter than the hopper is passed through the hem at the upper end of each sheet and a rod 15 is passed through the hem at the lower end of each sheet. The rod 14 on one side is then laid against the bottom of the hopper and the ends of the rod 15 are successively inserted in holes in a depending portion of the end plate of the hopper (see Figs. 1 and 3). When the other sheet is then attached in the same way, the sheets will be connected to the hopper as shown in Figs. 4, 5 and 6. In lieu of this arrangement, the sheets may be made shorter, one end of each sheet may be attached to the hopper and the other end passed over the upper roller and connected to a spring tending to draw it downwardly and thus pull the hopper up. Or the upper rollers may be spring operated and the sheets may roll up on them as a window shade rolls up on its roller. If either of these modifications are used, the side springs 8 may be dispensed with.

Extending upwardly from each end of the hopper and slidable along the outer face of the adjacent standard 2, is an upright 16, and carried by the upper ends of these uprights is a plunger bar 17 which is thus mounted to reciprocate with the hopper. The plunger bar extends through slots 18 in upper portions of the standards 2, these slots serving to guide the bar during its up and down movement and to prevent its tilting. The plunger bar carries a series of downwardly projecting pitting plungers 19 which are respectively positioned above and adapted to pass through the corresponding perforations in the punching block 3, resilient strip 4 and the channel bar 5.

The device for stripping the cherries from the plungers, upon which they have been impaled, and for insuring their removal from the punching block, is a tilting stripping bar 20 having trunnions 21 at its ends which project through the slots 18 and lie in the lower ends of slots in uprights 16 when the hopper is in elevated position. As the hopper descends the trunnions are caught by the lower ends of the slots 18.

Carried by rearwardly extending ears on the uprights 16 is a rod 22 which engages a lug 23 on the bar 20 and tilts it slightly as the hopper moves downwardly (see Fig. 5). This slight tilting movement is not great enough to cause the stripping bar 20 to come into contact with the plungers as they pass through a series of openings 24 in the stripping bar. The plunger bar 17 is provided with a pair of lugs 25 at each end which engage the stripping bar when the plunger bar reaches its limit of downward movement so that any swinging of the stripping bar is stopped and the stripping bar is steadied in its position of rest (see Fig. 6).

Figure 7:
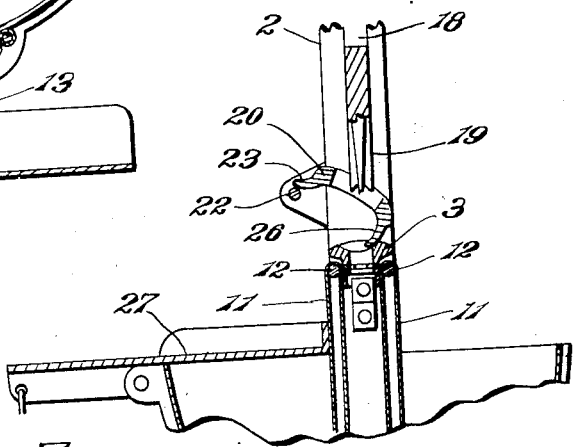
Fig. 7 is a fragmental section taken on the same plane as Fig. 6, showing the relation of the parts at a time during the upward movement of the hopper when the stripping bar is tilted to scoop the cherries from the depressions in the punching block.

As the hopper moves upwardly, such cherries as remain impaled on the plungers are stripped off and the rod 22 again engages the lug 23 and rocks the stripping bar. The lug 23 is so shaped that while the stripping bar is only slightly tilted during the downward movement of the rod, the upward movement of the rod rocks it through a considerable arc, as will be understood from an inspection of Fig. 7. The stripping bar has a series of scoops 26 projecting downwardly from its forward edge. As the bar is rocked by the rod 22 in its upward movement, the scoops 26 swing through the depressions in the punching block and the cherries which have remained in the depressions as well as those which have fallen upon the block after being stripped from the plungers are discharged from the block.

A dumping plate or tray 27 is pivotally attached to the hopper and overlies its rearward portion when the hopper is pushed down. The dumping plate is provided with a rigid rearwardly projecting arm 28 the free end of which is connected to the base plate 1 by means of a flexible member 29 including a retractile spring. As the hopper nears the limit of its upward movement the flexible member becomes taut and the plate is thus swung on its pivots. The swinging or dumping movement of the plate is limited by the engagement of extensions 30 with the rod 22, as is clearly shown in Figs. 3 and 4.

The operation of the machine will be understood from the following statement. If while the parts are in the positions in which they are shown in Figs. 1, 3 and 4, a supply of cherries is placed in the hopper, some of them will roll into the depressions in the punching block. If the handles 10 are not pushed downwardly, the cherries in the depressions will remain there while such other cherries as are upon the block will roll off and descend with the hopper. The dumping plate 27 will swing down upon the hopper. The stripping bar 20 and plunger bar 17 will descend until the trunnions 21 of the stripping bar are caught in the lower ends of the slots 18 in the standards 2, when the plungers 19 will pass through the stripping bar and pierce the cherries which have remained upon the punching block 3, punching out the pits.

When the springs 8 are allowed to raise the hopper 7, the plungers 19 will be withdrawn through the stripping bar 20 and such cherries as have been lifted by them will be stripped off, the bar will be rocked by engagement of the rod 22 with the lug 23 and the pitted cherries will be scooped off of the block 3 onto the dumping plate 27.

The stripping bar 20 will then be picked up when the trunnions 21 are engaged by the lower ends of the slots in the uprights 16 and carried upwardly out of the way so that a new charge of cherries can roll into the depressions during the further ascent of the hopper. As the hopper nears its limit of upward movement, the dump plate 27 will be swung on its pivots by the tautening of the flexible member 29 and the pitted cherries will be dumped from the machine, when the next charge of cherries may be pitted by again pushing the handles 10 downwardly.

It is apparent that the portions of the sheets 11 which come into contact with the contents of the hopper 7 will move up and down with such contents so that there will be no destructive grinding or mutilation of the fruit due to its being rubbed against a stationary part of the machine.

I have described a specific embodiment of my invention, but it is to be understood that such description is to be taken as illustrative only. The scope of the invention is indicated by the following claims.

Having thus described my invention, what I claim is:—

1. In a device having a hopper and a receiver to be fed therefrom, which hopper and receiver are relatively movable into and out of feeding relation, the combination with said hopper and receiver of a member which, when the hopper and receiver are out of feeding relation, forms a wall extending from the hopper toward the receiver and which is so arranged that the wall is shortened at the end toward the receiver when the parts approach feeding relation.

2. A device such as is set forth in claim 1 in which the wall forming member is a flexible sheet.

3. A device such as is set forth in claim 2 in combination with means adjacent said receiver over which said flexible sheet passes.

4. In a device of the class described, in combination, a receiver and a support therefor, a rod carried by said receiver support and extending adjacent an edge of said receiver, a second rod carried by said receiver support and extending parallel to the first-mentioned rod, a hopper, said receiver and hopper being relatively movable so that in one position of the parts an edge of the bottom of the hopper is adjacent the edge of said receiver, and a flexible sheet passing over said rods and having its ends attached to the said hopper.

5. In a device of the class described, in combination, a vertically reciprocating hopper having an opening in its bottom, a receiver which lies above said opening when the hopper is lowered and which occupies said opening when the hopper is elevated, walls which when the hopper is lowered extend upwardly from the edges of said opening, said walls being movable with said hopper, and means for shortening said walls at their upper ends when the hopper is elevated.

6. A device such as is set forth in claim 5 in which the walls are formed by flexible sheets.

7. A device such as is set forth in claim 6, in which the means for shortening the walls comprises rollers located adjacent the receiver.

8. A device such as is set forth in claim 6 in which the means for shortening the walls comprises rollers and means for drawing the sheets over the rollers.

9. In a cherry pitting machine of the class having a punching block and pitting plungers, the combination with said block and plungers of a stripping bar, means for moving said stripping bar prior to the stripping operation to a position immediately above said block, and means for moving said stripping bar after the stripping operation away from such position.

10. In a cherry pitting machine of the class having a punching block, the combination with said block of a discharging member, means for moving said discharging member to a position adjacent said block, means for moving portions of said member across said block, and means for moving said member away from said block.

11. In a cherry pitting machine of the class having a punching block and pitting plungers, the combination with said block and plungers, of a stripping bar having openings through which the plungers are withdrawn to strip off any cherries which remain impaled upon them, and means for moving portions of said stripping bar across said block to clear it of pitted cherries.

12. In a cherry pitting machine of the class having a punching block and pitting plungers, the combination with said block and plungers, of a stripping bar, means to move said bar prior to the stripping operation to a position immediately above said block, means to move portions of said bar over said block to clear it of pitted cherries, and means to remove said bar from said block after the clearing operation.

13. In a cherry pitting machine, in combination, a punching block having a series of cherry receiving depressions, a discharging member having a corresponding series of scoops, and means to move said scoops through said depressions.

14. In a cherry pitting machine, in combination, a punching block having a series of cherry receiving depressions, a rockable member having a series of scoops extending therefrom, and means to rock said member to swing said scoops through said depressions.

15. In a cherry pitting machine, in combination, a punching block having a series of cherry receiving depressions, a discharging bar having a series of scoops extending therefrom, means to move said bar to a position adjacent said block, means to rock said bar to swing the scoops through the said depressions, and means to move said bar away from said block.

16. In a cherry pitting machine of the class having a punching block provided with cherry receiving depressions, and a series of pitting plungers, the combination with said block and plungers of a stripping and discharging bar provided with a series of scoops, means for moving said bar prior to the punching operation to a position adjacent said block, means for rocking said bar to swing the scoops through the depressions, and means to then move the bar away from the block.

17. In a device of the class described, in combination, a punching block, slotted standards extending therefrom, slotted members extending adjacent said standards and movable relative thereto, a bar having lugs extending through the slots in the said standards and members and selectively supported in the lower ends of the slots.

18. In a device having a hopper and a receiver to be fed therefrom, which hopper and receiver are relatively movable into and out of feeding relation, the combination with such hopper and receiver of a dumping plate, means acting when the hopper and receiver are out of feeding relation to discharge the contents of said receiver onto said plate, and subsequently acting means to dump said plate.

19. In a machine having a vertically reciprocating hopper and a receiver, in combination, a dumping plate movable with said hopper, and means acting during the upward movement of said hopper to dump said plate.

CHARLES H. MARSHALL.